Aug. 11, 1959   E. A. EBERT   2,899,103
BAIT CONTAINER

Filed Aug. 17, 1956   2 Sheets-Sheet 1

INVENTOR.
Edward A. Ebert

Aug. 11, 1959
E. A. EBERT
2,899,103
BAIT CONTAINER
Filed Aug. 17, 1956
2 Sheets-Sheet 2
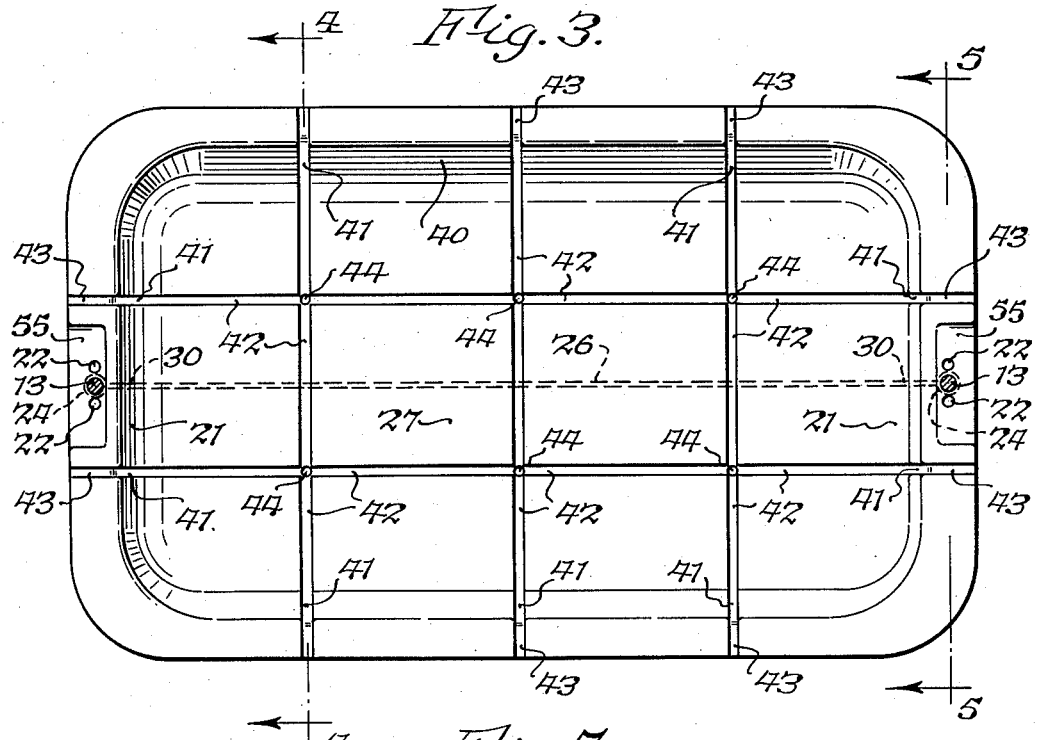
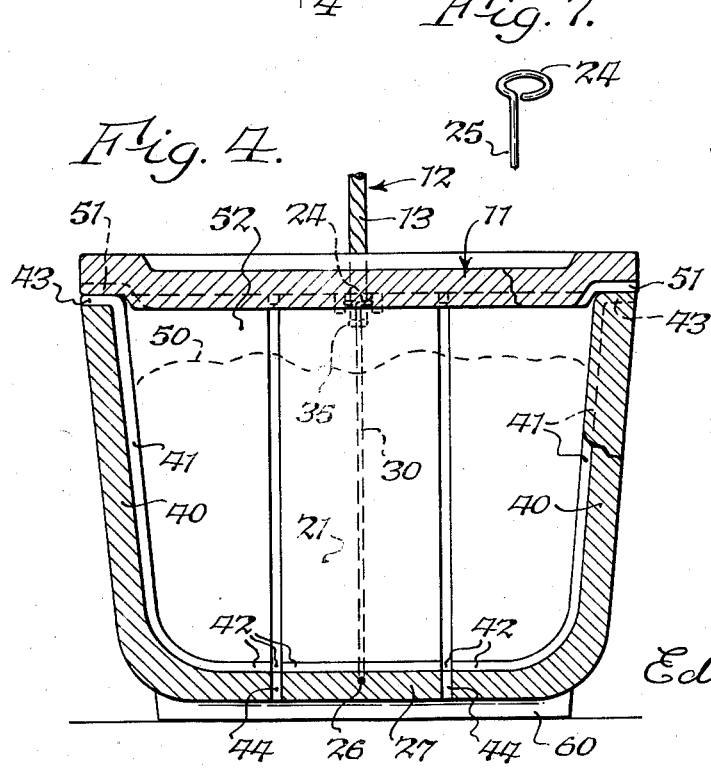
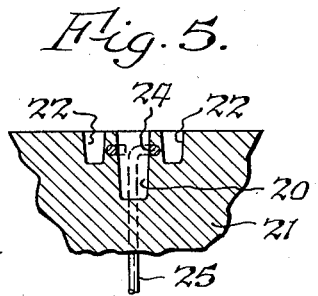
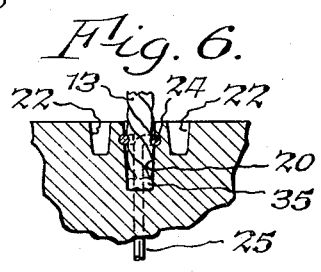
INVENTOR.
Edward A. Ebert

United States Patent Office 2,899,103
Patented Aug. 11, 1959

2,899,103

BAIT CONTAINER

Edward A. Ebert, Snyder, N.Y.

Application August 17, 1956, Serial No. 604,663

3 Claims. (Cl. 220—94)

This invention relates to containers used by fishermen to carry and keep live bait for use in the following of their sport. More particularly this invention relates to improvements in the construction of such bait containers to enhance their ability to keep bait such as worms, crawfish, etc. in a prolonged lively condition.

Not only is it desirable from the fisherman's point of view to keep such bait lively but from the long range view of conservation it is necessary that we preserve these natural fish foods so that there will be fish to fish for.

Accordingly among the objects of my invention may be mentioned the following:

To provide a bait container which will maintain a cool temperature in its interior, yet one, that will have sufficient insulation from heat outside the container.

To provide a bait enclosure which will through its ventilated construction permit evaporative cooling to take place in the material or bedding used in the container as a habitat for the live bait, To provide a container which does not have any metals or corrosive type materials exposed to the live bait or bedding, To accomplish the provision of a secure means for fastening the bail or carrying cord to the container while at the same time providing a reinforcement for the side and bottom walls of this container, To provide a construction which makes possible large volume production of this container at moderate cost.

With the above and other objects in view, my invention consists in the combination, arrangement and details of construction disclosed in the drawings and specification, and then more particularly pointed out in the appended claims.

In the drawings,

Fig. 3 is horizontal section taken along line 3—3 of Fig. 2 looking down into the container.

Fig. 4 is a vertical cross section taken along line 4—4 Fig. 3 showing the aeration grooves and vents.

Fig. 5 is a fragmentary vertical sectional view taken along line 5—5 Fig. 3 showing the method of fastening the bail cord to the container and reinforcing wire just before the fastening is completed.

Fig. 6 is an identical vertical section showing the fastening means gripping the bail cord.

Fig. 7 is a fragmentary perspective of one of the reinforcing wire ends.

Figure 1:
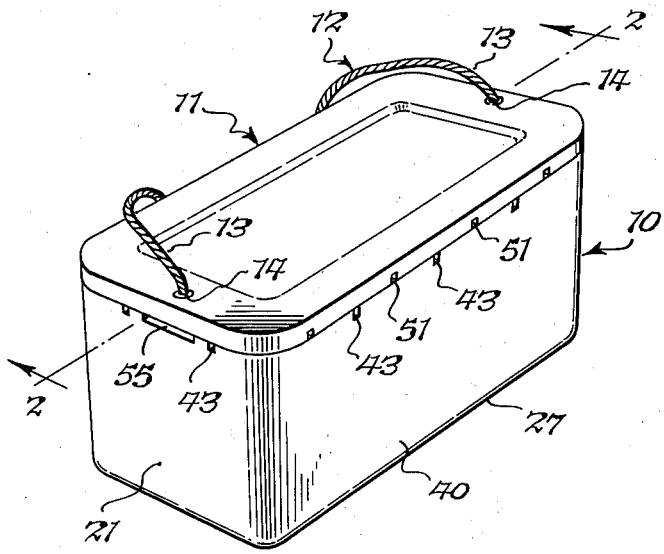
Fig. 1 is a perspective of the bait container with its cover in place.

The container 10 and its cover 11 may be molded of cellular plastic such as expanded polystyrene known to the trade as "Dylite" and "Styrofoam" or any of the foamed urethane synthetics such as "Poly Koolfoam" although other moldable materials such as papier mache or plaster might be used.

Materials such as "Dylite" have a very high K factor of insulation and therefore are very desirable for use in this container since most live baits must be protected from heat. This material also has a water absorption rate which is very low, in the order of less than .5% by volume after eight days' immersion at room temperature. These materials also are very light in weight and yet are physically strong enough to be put to this use. Since the water absorption rate is very low containers made of this material will stay light in weight because they will not pick up enough moisture from the moist bedding used for the live bait to become heavy and water logged. This material also has high resistance to fungus and bacteria which are ever present where live baits and moist beddings are used.

A bail cord 12 having its ends 13 passing through openings 14 of the cover 11 and then fastened to the container 10, control the cover 11 in its open and closed positions as set forth in my pending application for Bait Box or Container, Ser. Number 588,724 filed June 1, 1956.

Figure 2:
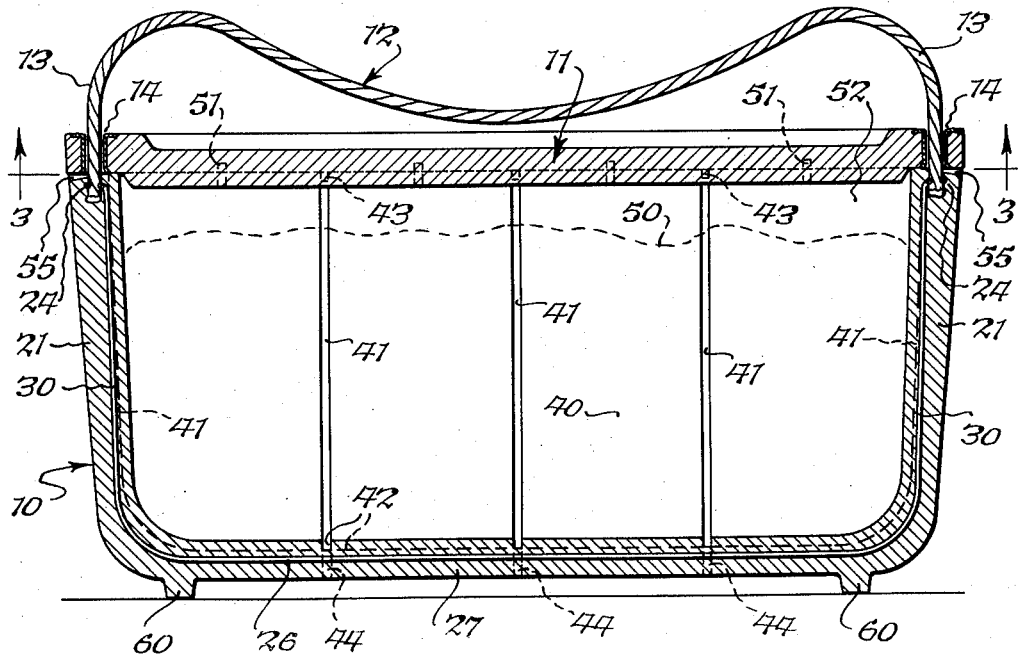
Fig. 2 is a vertical longitudinal section taken along line 2—2 of Fig. 1.

Cover 11 closes the mouth of the container 10 as shown in Fig. 2 and Fig. 4 while in its open position the bail cord 12 restrains and holds the cover 11 alongside the container 10.

The bail cord ends 13 are inserted into sockets 20 molded into the end walls 21 of the container. On either side of this socket 20 a pair of smaller sockets 22 are provided, the purpose of which will be explained shortly. The socket 20 is embraced by a ringed eye 24 which is part of a reinforcing wire 25. This wire 25, as shown in Fig. 2 and Fig. 3, is generally of U shaped conformity having a horizontal portion 26 embedded in the horizontal bottom wall 27 of the container 10. Upright legs 30 are embedded in the end walls 21 of the container where the horizontal ringed eyes 24 terminate at the top of end walls 21.

Preferably the bail cord ends 13 are heated if the bail cord is of plastic such as nylon. When heated the plastic melts and forms an integral fused button 35 or solid portion on the ends of the cord. The end is then inserted into one of the sockets 20 and the nibs of a pair of round nosed pliers are each inserted into the smaller sockets 22. Upon squeezing the pliers the embracing ringed eye 24 is closed tightly around the cord end 13. The other cord end 13 is then placed into the opposite socket 20 and the operation repeated, thus completing the assembly of the bail cord 12 cover 11 and container 10. As will be seen in Fig. 6 the plastic which forms a wall between the sockets 20 and 22 deforms when the eye 24 is closed and then more or less returns in place.

If cotton or other non fusible cord is used, the ends 13 might be dipped into a cement to harden or form a knot on the ends 13 of cord 12 to prevent slipping of the cord ends through the ringed eyes 24.

The container 10 comprises the bottom wall 27, the end walls 21 and connecting side walls 40. All of these walls are channeled by vertical grooves 41, which grooves 41 are all interconnected by horizontal portions 42 in the bottom wall 21. At their upper extremities the grooves 41 terminate in horizontal portions 43 which connect to the atmosphere outside the container.

At the points of intersection of the grooves 42 in the bottom wall 27, through openings 44 may be provided.

These grooves 41, 42, 43 and openings 44 are of a small enough size that the normal garden variety angle worm cannot escape through them.

Since the container 10 and cover 11 are preferably made of a material which has good thermal insulation this will provide the necessary barrier to heat from the outside. The small vents 43 and 44 to the outside atmosphere will permit limited circulation of air into and out of the interior of the container 10. It might be said at this point that the air entering the interior of the container might not necessarily be warm air since the air might be cool with the container standing in the sun. On the other hand the air might be warm but the small vents 43 and 44 limit the amount of warm air entering or escaping. The grooves or channels 41, 42 cover all faces of the walls and bottom of the container and thus in effect can supply fresh air to all parts of the bedding used as well as remove therefrom undesirable gases. The surrounding of the moist bedding with air by means of the channels 41, 42 and the vent openings 43, 44 thus permit evaporative cooling to take place in and around the moist bedding used, which lowers the temperature of the bedding for better keeping of the live bait not only by a cooler habitat but by aeration available to the live bait and also the removal of undesirable spent air and gases.

Bedding materials will usually be placed in the container 10 about up to the dotted line 50 which provides an air space 52 above the bedding and which connects all of the vents 43, 44 and grooves 41, 42 together for free interchange of air.

The cover 11 may be provided with additional vents 51 if desired for added circulation of air.

Depressions 55 may be provided in the top side of the end walls 21 to facilitate the lifting of the cover 11 to open the container.

The bottom wall 27 is provided with feet 60 which serve to allow air to get to the vents 44 and also prevent insects, grubs, etc. which would enter the container if it were permitted to contact the ground.

From the foregoing it must now be obvious that an insulated container construction is provided which guards the bait bedding or habitat from excessive heat, which exposes the bedding to aeration and ventilation by the vents 43, 44, and 51 and the grooves 41 and 42 which vents and grooves permit evaporative cooling to take place and which vents 44 will provide drainage of excessive moisture.

If found to be desirable in some uses the bottom vents 44 may be eliminated without impairing ventilation, through only the upper vents 43 and grooves 41 and 42. It may also be desirable in some cases to eliminate the vents 51 in the cover to limit circulation of air further.

Also if desired one or more partitions may be fitted into the grooves 41, 42 thereby dividing the container for say a compartment with worms and one with crabs thus increasing the container's versatility and usefulness.

It will be understood that various changes in the details, materials and conditions which have been herein above described in order to explain the nature of my invention may be made by those skilled in the art within the principle and scope of the invention as expressed in the appended claims.

I claim:

1. A container of the character described, comprising a body having side walls molded of a material capable of being distorted, a handle having opposite ends projecting into sockets in opposite sides of said body, metal members embedded in said opposite sides of said body and each formed to provide an eye embracing a corresponding socket and the end of the handle contained therein, each of said sockets being flanked by a pair of sockets extending from the exterior into said body and adapted to receive the nibs of a pair of pliers to distort said eyes into compressive relation with the ends of said handle.

2. A container as set forth in claim 1 wherein said material of said body is multicellular polystyrene.

3. A container as set forth in claim 1 wherein said handle is in the form of a flexible cord.

References Cited in the file of this patent

UNITED STATES PATENTS

| | | |
|---|---|---|
| 620,805 | Russ | Mar. 7, 1899 |
| 871,955 | Reed | Nov. 26, 1907 |
| 1,054,072 | Yancey | Feb. 25, 1913 |
| 1,960,747 | Marks | May 29, 1934 |
| 1,983,153 | Swerdloff | Dec. 4, 1934 |
| 2,144,661 | Nelson | Jan. 24, 1939 |
| 2,328,993 | Norling | Sept. 7, 1943 |
| 2,558,322 | Stine | June 26, 1951 |
| 2,561,488 | Barker | July 24, 1951 |
| 2,572,763 | Robertson | Oct. 23, 1951 |
| 2,732,119 | Risch | Jan. 24, 1956 |

FOREIGN PATENTS

| | | |
|---|---|---|
| 16,065 | Great Britain | 1891 |